United States Patent [19]

Bricot et al.

[11] 4,344,164

[45] Aug. 10, 1982

[54] OPTICAL DEVICE FOR ACCESS TO A TRACK CARRIED BY A DATA CARRIER AND OPTICAL MEMORY SYSTEM INCORPORATING SUCH A DEVICE

[75] Inventors: Claude Bricot; Dominique Leterme, both of Paris, France

[73] Assignee: Thomson-CSF, Paris, France

[21] Appl. No.: 174,564

[22] Filed: Jul. 4, 1980

[30] Foreign Application Priority Data

Aug. 3, 1979 [FR] France ................. 79 19973

[51] Int. Cl.³ .............................................. G11B 7/08
[52] U.S. Cl. ..................................... 369/44; 369/110; 369/111; 369/116
[58] Field of Search .................. 369/44, 45, 46, 76, 369/100, 109, 110, 111, 112, 116; 358/128.5; 346/76 L, 108

[56] References Cited

U.S. PATENT DOCUMENTS 3,959,581  5/1976  Laub .................................. 369/45 X
3,982,253  9/1976  Goshima et al. ............... 346/108 X
4,138,741  2/1979  Hedlund et al. .................. 369/44 X
4,179,708  12/1979  Sheng et al. ........................ 369/112
4,198,657  4/1980  Kanamaru ............................ 369/45

*Primary Examiner*—John H. Wolff
*Assistant Examiner*—Donald McElheny, Jr.
*Attorney, Agent, or Firm*—Oblon, Fisher, Spivak, McClelland & Maier

[57] ABSTRACT

Optical device for giving access to a track carried on a moving data carrier incorporating a moving element comprising a galvanometric mirror and a focusing objective movable relative to the data carrier and a fixed light energy source incorporating at least one laser emitter. Magnifying optical means of the afocal type are also inserted between the moving element and the light energy source. The magnification is sufficient to ensure that the beam emerging from the optical means completely covers the entrance pupil of the objective. As a result of this arrangement, the beam of light reaching the moving element remains a beam of parallel rays, no matter what the position of said element relative to the light energy source.

8 Claims, 7 Drawing Figures

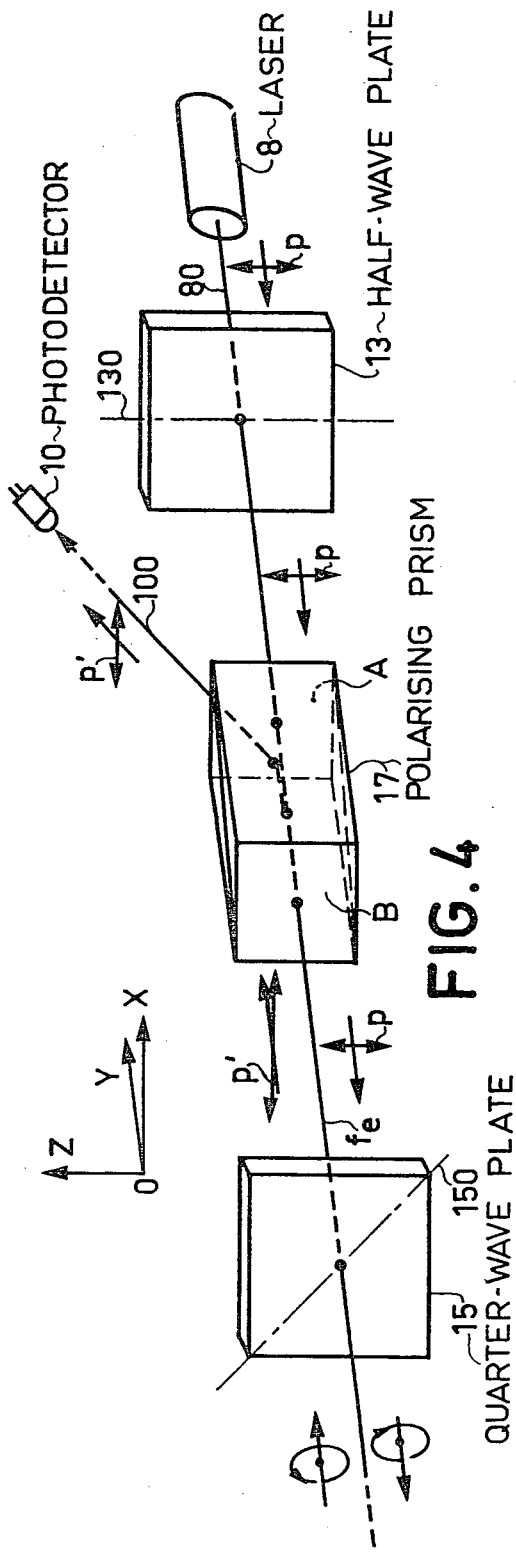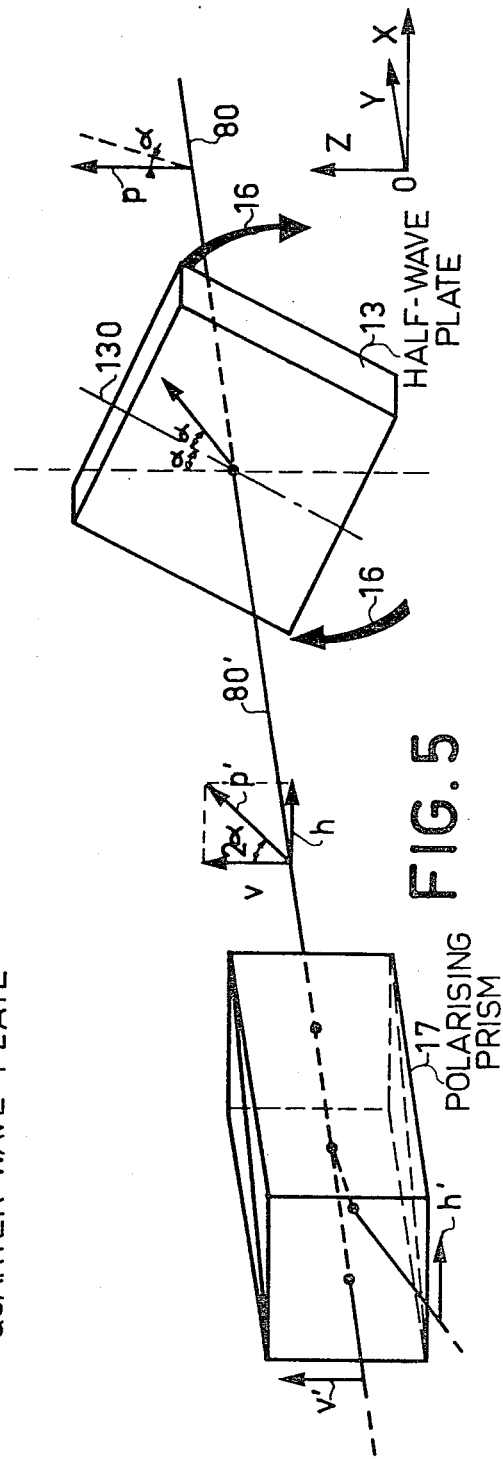

OPTICAL DEVICE FOR ACCESS TO A TRACK CARRIED BY A DATA CARRIER AND OPTICAL MEMORY SYSTEM INCORPORATING SUCH A DEVICE

BACKGROUND OF THE INVENTION

The invention relates to an optical device for access to a track on a data carrier and an optical memory system incorporating such a device.

The invention more particularly relates to reader and recorder systems in which the data carrier is a disk. At present, it is possible to record approximately $10^{10}$ data bits on a disk having a diameter of about 30 cm. These systems can be used as a mass memory or digital data processing machines. These systems must permit a random source to a predetermined part of the recorded data, for example a block of binary words of fixed or variable length. In addition, the computing speed of the data processing units requires numerous changes between the peripheral memories and these computing units. It is therefore necessary that access to a predetermined track of a moving data support takes place in the shortest possible time, either for reading prerecorded data or for recording such data, no matter what the position of this track on the disk. The average access time must be below 100 milliseconds.

The presently available track access devices are substantially intended for disks on which the recorded data contains a video signal. In such systems, the data access time is a few seconds, which is sufficient for this purpose.

In the prior art access devices, the correct radial positioning of an optical reading and/or recording head is obtained by mechanical means ensuring either the displacement of the head, or most frequently the displacement of the disk. When the reading head and disk are correctly positioned relative to one another, the radial following of the circular or helical track on which used to be recorded or is already recorded the data is brought about by means of a galvanometric mirror which moves around an axis parallel to the plane of the disks, which reflects a beam produced by at least one light energy source incorporating a laser. The head also has a device ensuring the vertical control of the lens used for recording and/or reading.

No matter what solution is adopted the moving means has too great a mass to be compatible with the average access times desired in data processing. For example, in the solution involving displacing the disk, the latter being fixed to a rotary mechanism particularly incorporating the drive motor, a mass of approximately 1 kg must be set in motion.

BRIEF SUMMARY OF THE INVENTION

To obviate these disadvantages, the invention proposes an access device in which only the recording head is movable, the laser energy source remaining fixed and afocal optical means ensuing the optical connection between the energy source and the record-read head.

The invention therefore relates to an optical device for access to a track on a moving data carrier, which can be optically recorded or read by focused radiation, incorporating a fixed light energy source having at least one radiating element producing a beam of parallel rays centered about an axis and collected by a moving element which moves parallel to said axis with respect to the data carrier, the moving element incorporating a deviating mirror and an objective which focuses the beam onto a predetermined track on the carrier, wherein fixed afocal optical magnifying means are inserted between the moving element and the light energy source, the magnification of said optical means being sufficient to ensure that the emergent beam totally covers the entrance pupil of the objective.

The invention also relates to an optical memory system incorporating an optically recordable and readable support, as well as to a device for access to a track carried by this support.

BRIEF DESCRIPTION OF THE DRAWINGS

The invention is described in greater detail hereinafter relative to non-limitative embodiments and the attached drawings, wherein show:

FIGS. 4 and 5 relate to special operating modes of the optical system.

FIG. 6 illustrates in a more detailed manner a special member of the optical system.

DETAILED DESCRIPTION OF THE PREFERRED EMBODIMENTS

Hereinafter, elements common to two or more drawings will carry the same reference and will only be described once.

As the invention relates to the device for giving access to one of the tracks of a data carrier and particularly a predetermined track on a disk, it is worth recalling the constituent parts of a system for recording and/or reading such a carrier. More specifically, the invention relates to an optical recorder-reader system, whose reading head moves along an axis passing through the center of the data carrying disk. Such a disk can be used either for entering data at a given point of a previously entered smooth track, or for reading the data entered at a random point on said track. The disk, which has a diameter of approximately 30 cm, is given a rotary movement by a drive motor fixed to the chassis of the optical recording-reading system. According to the invention, the device for giving access to a predetermined track of the disk comprises a fixed part constituted by light energy sources and a moving part constituted by the recording-reading head. The latter comprises an objective of the microscope type fixed to an electromagnetic coil moving in the magnetic field of a permanent magnet ensuring the vertical control and a galvanometric mirror ensuring the radial control. As is also known, the light energy sources comprise laser sources, for example He Ne gas lasers. These lasers supply a polarized parallel beam having a very limited cross-section. The laser beam must be magnified in such a way that it covers the entrance pupil of the objective, no matter the position of the latter along the optical axis. To satisfy this first requirement, the invention proposes the insertion of an afocal optical system between the light energy sources and the moving recording-reading head.

Figure 1:
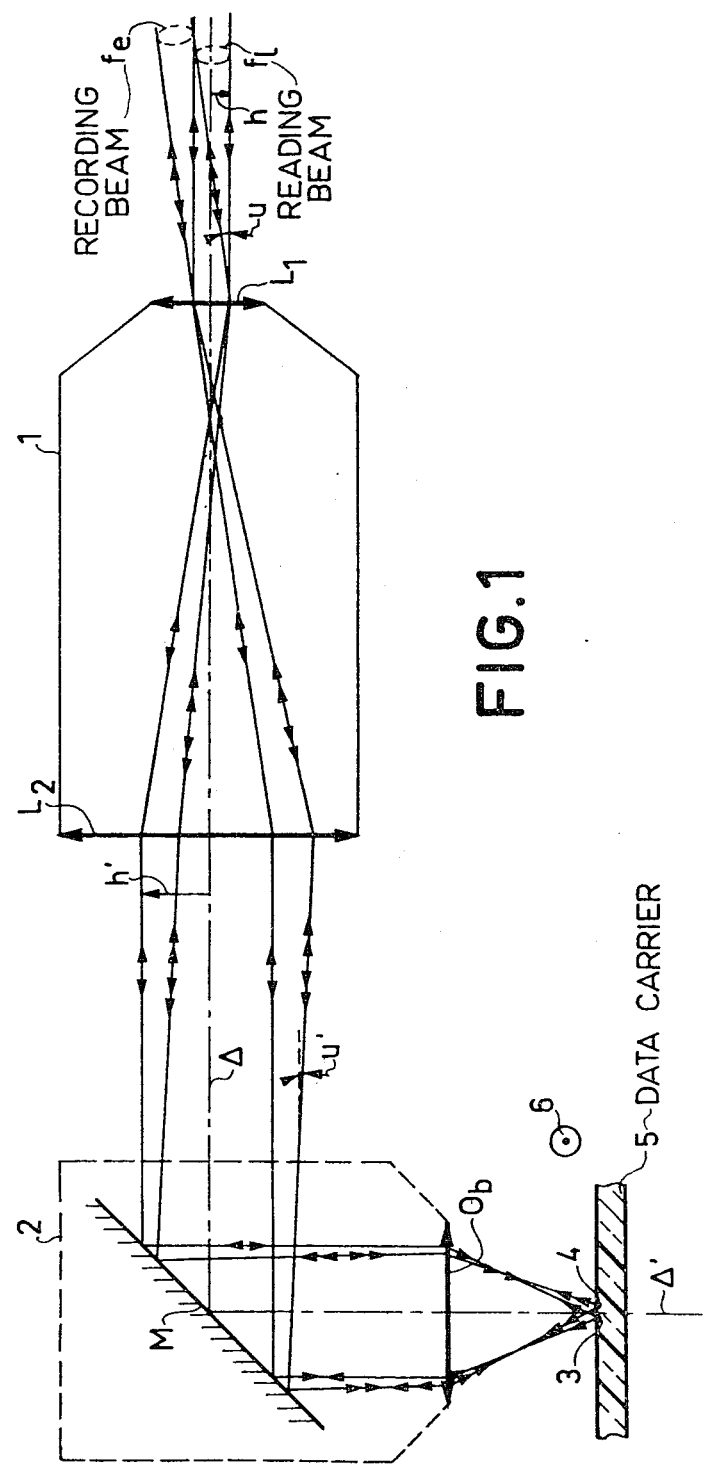
FIG. 1 an optical diagram of a device for giving access to a track on a moving carrier according to the invention.
Figure 2:
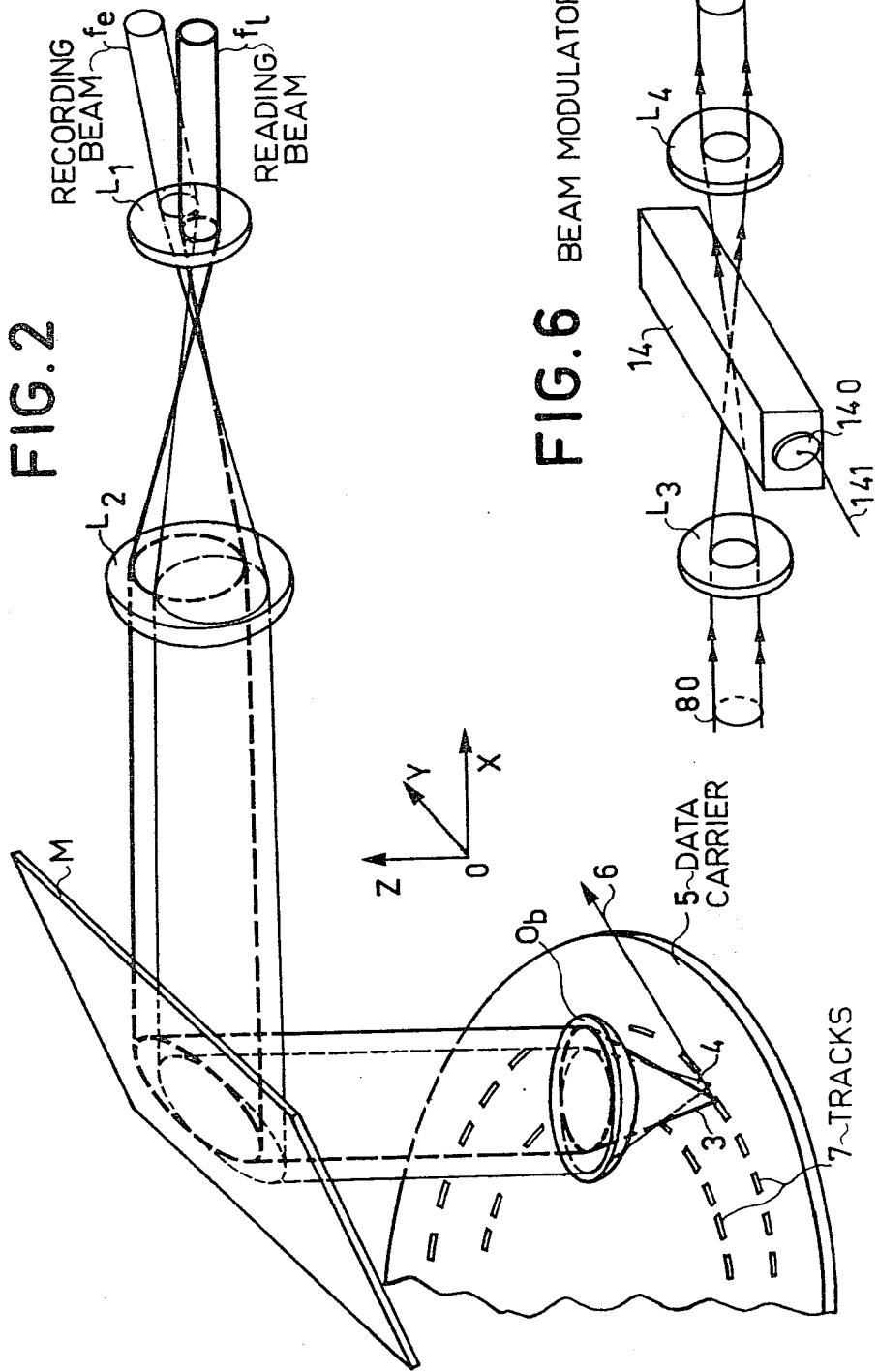
FIG. 2 illustrates the operation of this device.

These arrangements are illustrated in FIGS. 1 and 2, FIG. 1 being the optical diagram in a plane of the device giving access to a track according to the invention.

For reading purposes, a parallel, polarized laser beam $F_1$ produced by a laser source (not shown in FIG. 1) is magnified by means of an afocal system 1 incorporating two lenses $L_1$ and $L_2$, whose magnification is such that the also parallel emergent beam covers the entrance pupil of a microscope-type objective $O_b$. A mirror M is inserted between afocal system 1 and objective Ob in such a way that it deviates the rays propagating parallel to the optical axis $\Delta$ into a direction parallel to said axis $\Delta'$. Objective $O_b$ focuses the reading beam at point 3 onto the data carrying disk 5, which is rotated in the manner indicated by arrow 6. The objective and the mirror are fixed to a moving means 2 constituting the recording-reading head. The forward movement of this moving means can be obtained in any known manner and, e.g. in non-limitative manner, either by means of a tape driven by pulleys (as is generally the case with curve plotters) or by means of a nut and a screw driving balls (as in the case of certain recorders-readers and so-called floppy disk systems) or by a linear motor. These devices do not fall within the scope of the invention.

The structure of the invention, which dissociates the light energy sources from the recording-reading head per se, makes it possible to reduce the mass of the moving means to approximately 200 g, whereof 100 g are for the control device in accordance with the axis $\Delta'$ and 30 g for the galvanometric mirror and its driving device, the objective having a negligible weight. This reduced mass is compatible with the average access times referred to hereinbefore.

The same afocal system is then used for the recording beam, which has previously been modulated as in conventional recorders-readers. In order to differentiate the reading and recording spots on the disk, the recording beam $f_e$ is inclined very slightly relative to the reading beam $f_1$. The transverse magnification is given by the equation $Y=h'/h$. This magnification is much larger than 1, so that the ratio of the angles is less than 1. Thus, the decentering of the recording spot on the entrance pupil of the objective is very limited. It is also possible to ignore this displacement during a radial displacement of the head. Thus, no matter what the position of the objective along the optical axis $\Delta$, the writing beam is focused on the focus of the objective, whilst ensuring a good discrimination, on leaving the afocal system, of the recording and reading beams. The latter point constitutes a second problem solved by the structure according to the invention.

As will be described hereinafter relative to FIG. 3, a wobbulator is used for the radial control of the head. For the same reasons as described hereinbefore, there is no longer any need for the wobbulator to be perfectly optically paired with the entrance pupil of the objective.

FIG. 2 illustrates the path of the light rays. Disk 5 is substantially parallel to a plane XOY. The vertical control takes place in a direction parallel to axis OZ. The axis $\Delta$ or the optical axis of the afocal system incorporating two lenses $L_1$ and $L_2$ is parallel to the axis OX. Mirror M has an inclination varying about $\pi/4$ radians relative to the XOY plane. As a non-limitative example, the typical values are: focal distances of $L_1$:8 mm and $L_2$:100 mm; focal distance of $O_b$:8.25 mm, numerical aperture N.A.:0.455, diameter 7.51 mm.

Figure 3:
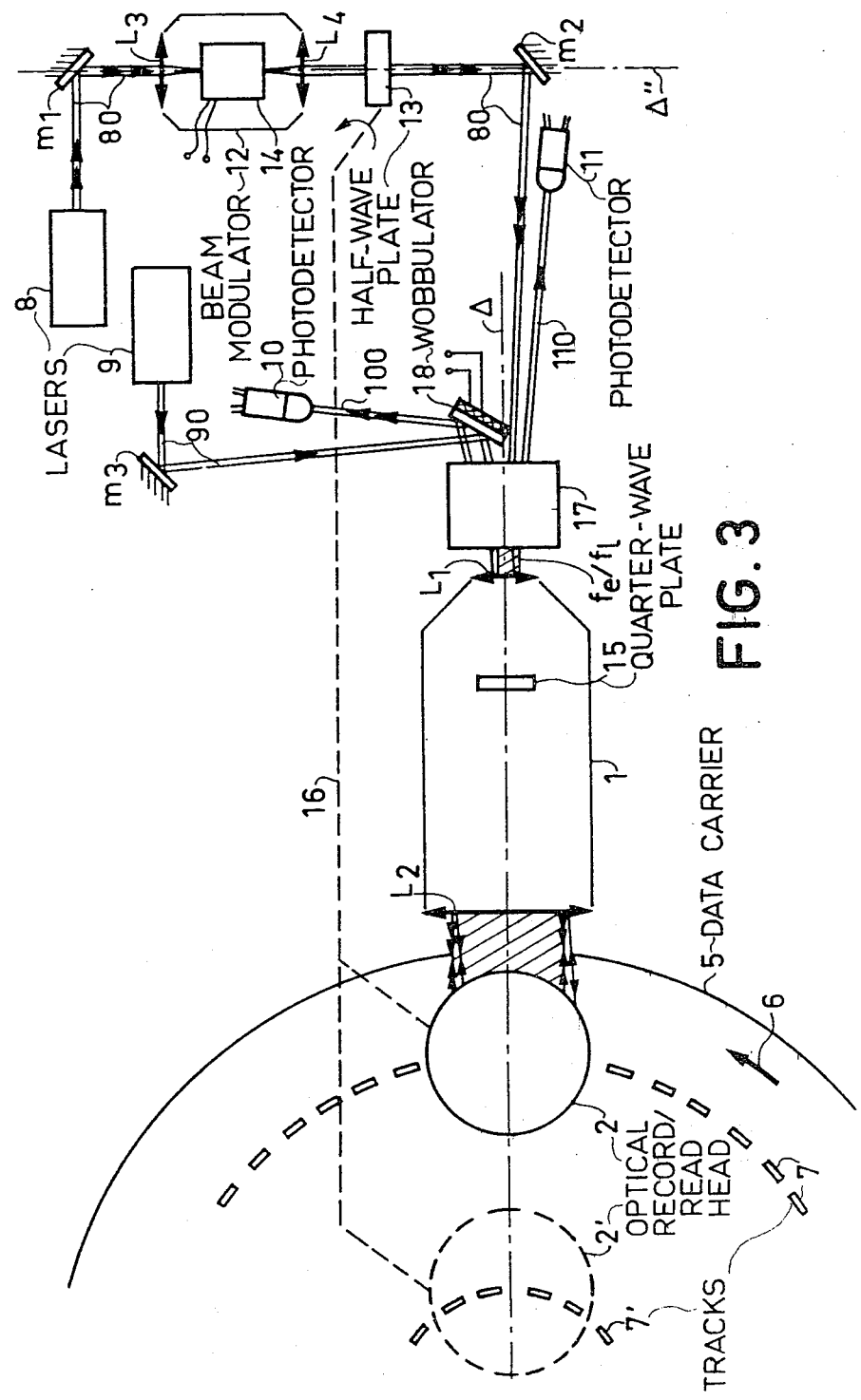
FIG. 3 illustrates the operation of an optical recorder-reader system incorporating the device according to the invention.

FIG. 3 shows an optical disk recording-reading system incorporating the optical device giving access to a track in accordance with the invention. The record-read head incorporating objective $O_b$ and mirror M is indicated by circle 2. The afocal system carries the reference 1 and incorporates lenses $L_1$ and $L_2$ having for its optical axis $\Delta$. Disk 5 has recording and/or reading tracks 7, 7'. The recording track is constituted by the following consecutive elements: a polarized laser 8 producing a beam of parallel rays 80 deviated in accordance with the axis $\Delta''$ by a first mirror $m_1$, an acousto-optical or beam modulator 12, a parallel half-wave plate orientable relative to the axis $\Delta''$: 14 and a second mirror $m_2$ deviating the beam 80 towards a birefringent separating or splitting element 17. The recording beam then enters the afocal system 1 and after reflection on the disk is turned back towards the same birefringent separating element 17, after which it is reflected by a wobbulator 18 into a beam 100 reaching a photoelectric recording cell 10. A parallel quarter-wave plate 15 is also located on the optical path between lenses $L_1$ and $L_2$.

The reading path comprises the following elements: a polarized laser 9 producing a beam of parallel rays 90 deviated by a mirror $m_3$ before reaching the reflecting surface of the wobbulator 18 and being deviated towards the birefringent separating element 17. The reading beam is then magnified by the afocal system and, after reflection onto the disk and return by afocal system 1, is reflected onto the birefringent separating element 17 and transmitted along beam 110 to a reading cell 11. Reading cell 11 performs two functions, namely by subtracting an error signal is obtained by means of asymmetrical or astigmatic sensors giving information on the focusing and by adding a high frequency reading signal is obtained. Such processes are described in the two following French patent applications: No. 7,529,705, filed on Sept. 29, 1975 and published as No. 2,435,953; 74.01 283, filed on Jan. 15, 1974 and published as No. 2,271,590. This cell is of the four-quadrant type, for example RCA model C30843.

The recording cell 10 can be used to check the recording signal, as well as for accurately locating on the disk the zones to be recorded and also for checking the power control of the laser by a process to be described hereinafter. The cell can be of the two-quadrant type, for example SIEMENS model BPX48.

The acousto-optical or beam modulator can, for example, be of the type illustrated in FIG. 6. It incorporates two cylindrical lenses $L_3$ and $L_4$ forming an afocal system for beam 80. This beam is focused by the first lens into a lead molybdate bar for 14 incorporating at its end a lithium neobate pellet 140 connected to an electrode 141. A signal composed of electrical pulses of frequency 2 MHz is applied to this electrode. Volume waves interfering with the light waves are produced in the material of bar 13. Thus, on leaving the bar, the beam is modulated by these volume waves at the excitation frequency. This modulation process is well known in the presently used recorder-readers and does not require a more detailed description.

The deviating mirrors $m_1$ to $m_3$ of FIG. 3 are multilayer glass mirrors. Wobbulator 18 is constituted by a vibrating beam incorporating an electrically excited piezoelectric element.

The path of the rays will now be described in greater detail by means of FIGS. 4 and 5. FIG. 4 shows a laser source, for example a recording laser 8 producing a beam of polarized rays 80 in direction p. This drawing does not show the deviating mirrors $m_1$ and $m_2$, as well as the electroacoustical modulators 12. The beam 80 reaches a parallel half-wave plate 13, whose optical axis is represented by the dotted line 130 parallel to the axis OZ of the reference trihedron OXYZ. It follows that as the polarization of beam 80 is also parallel to this direction, the beam leaves the parallel plate 13 unchanged. The polarized light rays then reach a birefringent element 17, which can for example be a Wollaston or Rochon. This element is disposed in space in such a way as to transmit without modification a wave polarized in the axis OZ. This transmitted wave then reaches the quarter-wave plate 15 positioned in the afocal system 1 of FIG. 3. The optical axis of the plate is represented by the dotted line 150. Thus, the linearly polarized wave leaves this parallel quarter-wave plate polarized in a circular manner and, for example, in the levorotatory direction. This wave is transmitted to the elements of the record-read head and is reflected by the disk. It is then turned back towards the quarter-wave wave plate, still polarized in a circular manner but in the dextrorotatory direction. As a result, this wave is turned back towards the birefringent element 17 polarized in a horizontal manner after traversing the quarter-wave plate, i.e. in a direction parallel to axis OX. The birefringent element 17 then serves as a separator and the wave polarized in a direction parallel to OX is transmitted in the XOY plane to a reading cell 10. For the system of FIG. 3 to function correctly, the reading beam (not shown in FIG. 4) and also polarized, must reach the face A of birefringent element 17 in a direction which is essentially parallel to the direction of beam 100 and the polarization direction must also be parallel to axis OX. It follows that this beam is deviated and leaves the face B in a direction essentially parallel to that of the recording beam $f_e$. However, these two beams form between them the angle u (FIG. 1) necessary for the separation.

If the parallel half-wave plate 13 is now turned by an angle $\alpha$ relative to direction OZ, the polarization direction p of the beam of parallel rays 80 also forms an angle $\alpha$ relative to the optical axis of plate 130. It follows that the emergent beam 80' of plate 13 undergoes a change in its polarization direction by an angle of 2 $\alpha$ relative to OZ. The new polarization direction is p'. The polarization vector p' can be broken down into two vectors of respective amplitude v and h (by projecting it onto two axes OZ and OX). The ray polarized in the direction p' is broken down on passing through the birefringent element 17 into two rays, one polarized vertically of amplitude v', the other polarized horizontally of amplitude h'. Only the component v' is transmitted to the quarter-wave plate 15 of FIGS. 3 and 4. As a result of this process, it is possible to modify the power of the writing beam (because v'<p' in accordance with the value of $\alpha$). In order to bring about a power control, a mechanical connection is established between the position of the moving means 2 and the angular orientation $\alpha$ of parallel plate 13. This control 16 can be simply realised by a belt connected to the moving means 2 or by an ancillary motor connected to the motor for translation in accordance with axis $\Delta$.

The half-wave plate can be replaced by a polarizer. However, this method has the disadvantage of introducing insertion losses and of lowering efficiency. It is also possible to act electrically by acting directly on the control of the acousto-optical modulator 12.

Besides those specifically referred to hereinbefore, other types of birefringent elements can be used. As is known, incidence conditions of the rays, as well as polarization conditions of the rays of both an ordinary and an extraordinary nature correspond to teach type of birefringent element.

The function of the wobbulator is to impart to the reading beam (whose average radial position is ensured by the galvanometric mirror m of FIGS. 1 and 2) an oscillation in a radial direction and of approximate amplitude 0.1 $\mu$m. The excitation frequency is 78 kHz.

The invention can also be extended to the case of an optical system used for reading only prerecorded data on a disk. An example of an interesting application is the case where a disk recorded by means of an optical system of FIG. 3 is duplicated and distributed to a number of users having an optical reader system as illustrated in FIG. 7.

For this purpose, it is merely necessary to eliminate the elements belonging to the recording channel. There is also a slight modification with regard to the arrangement of the elements of the reading channel. Thus, the wobbulator 18 can be positioned between the afocal system 1 and the birefringent separating element 17. In this case, both entering beam 90 and beam 110 are modulated. As in the case of FIG. 3, the birefringent element 17 serves to separate or split these two beams.

Figure 7:
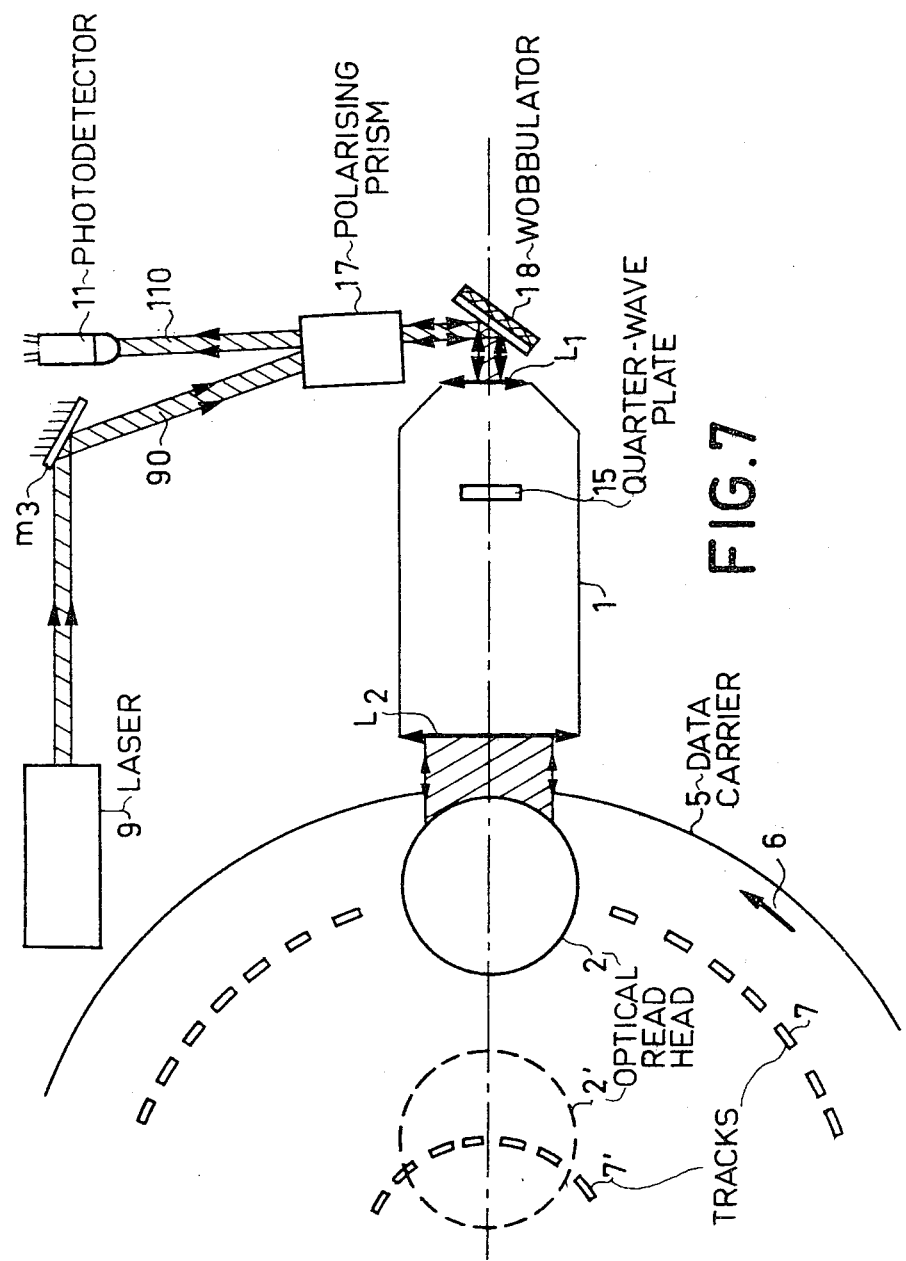
FIG. 7 a second variant of an optical system incorporating the device according to the invention.

The invention is not limited to the embodiments described hereinbefore and in particular to the arrangements used for the application examples of FIGS. 3 and 7. It is, for example, possible to use the optical device for access to a track on a moving data carrier in connection with a video disk, although the access time is not as critical as in constructions intended for data processing. It is also possible to envisage reading by transparency and not be reflection, as described with reference to FIGS. 3 and 7. The two reading and recording beam are then transmitted after magnification by the afocal system to the read-record head and are read by cells placed below the disk. Finally, the invention is not limited by the nature or shape of the moving data carrier. In particular, this carrier can have the form of an optically readable tape carrying longitudinal tracks. In this case, the access devices according to the invention permit a rapid jump from one track to the next.

What is claimed is:

1. An optical device for access to a track on a moving data carrier, which can be optically recorded or read by focused radiation, incorporating a fixed light energy source having at least one radiating element producing a beam of parallel rays centered about an axis and collected by a moving element which moves with respect to the data carrier parallel to said axis of said beam, the moving element incorporating a deviating mirror and an objective which focuses the beam onto a predetermined track on the carrier, wherein fixed afocal optical magnifying means are inserted between the moving element and the light energy source, the magnification of said optical means being sufficient to ensure that the emergent beam substantially covers the entrance pupil of the objective, wherein the energy source comprises first and second laser emitters respectively producing the first and second parallel beams polarized in linear manner in accordance with a first and a second direction, the respective polarization directions being orthogonal to one another, the propagation direction of said first beam also coinciding with the optical axis of the afocal optical means in order to penetrate the same at a normal incidence and the direction of the second beam of parallel rays forming a predetermined small angle with the optical axis.

2. An optical device according to claim 1, wherein the afocal optical means are constituted by two convergent lenses, whose common optical axis coincides with the axis of the beam of parallel rays.

3. An optical memory system incorporating an optically recordable and readable carrier, as well as an access device to a track carried by the carrier in accordance with claim 1, the track also being able to reflect all or part of the light energy which they receive, wherein a birefringent separator or splitter is inserted between the afocal or optical means and the light energy source, the incidence angles of the first and second beams of parallel rays on a first face of the birefringent separator or splitter and their polarization direction being such that these beams coincide therefore with the ordinary and extraordinary rays of the prism.

4. A system according to claim 3, wherein a quarter-wave plate with parallel faces is inserted on the optical path of the rays of the first and second beams downstream of the birefringent separator and transforms the linear polarizations of the first and second incident beams into a circular polarization and wherein after reflection on the tracks carried by the data carrier and inverse return of the light, the quarter-wave plate with parallel faces re-transforms the circular polarizations of the first and second beams of parallel rays into linear polarizations which are orthogonal to one another, the polarization directions having also turned by an angle of $\pi/2$ radians relative to the original directions of said first and second polarization directions, the first and second beams of parallel rays being deviated after traversing the birefringent separator respectively in accordance with the directions of the extraordinary and ordinary rays.

5. A system according to claim 4, wherein as the first beam of parallel rays is the recording beam, a half-wave plate with parallel faces is inserted under normal incidence between the birefringent separator and the first laser emitter and wherein the optical axis of the half-wave plate with parallel faces forms a regulatable angle $\alpha$ with the first polarization direction, the polarization direction of the first beam turning by a double angle and the resulting rays are broken down during the traversal of the birefringent separator into an ordinary ray, which is only transmitted to the afocal optical means and whose polarization direction is parallel to the first polarization direction, and an extraordinary ray whose direction is orthogonal to the first polarization direction.

6. A system according to claim 4, wherein the first beam of parallel rays is the recording beam, so that a polarizer is inserted under normal incidence between the birefringent separator and the first laser emitter and wherein the optical axis of this polarizer forms a regulatable angle $\alpha$ with the first polarization direction and the resulting rays are broken down whilst traversing the birefringent separator into an ordinary ray, only transmitted to the afocal optical beams and whose polarization direction is parallel to the first polarization direction, and an extraordinary ray whose polarization direction is orthogonal to the first polarization direction.

7. A system according to either of the claims 5 or 6, comprising mechanical coupling means coupling the moving element to said polarizer for continuously varying the regulatable angle $\alpha$ in predetermined relationship based on the position of the said moving element to bring about a power control of the recording beam.

8. A system according to claim 7, wherein the moving data carrier is a disk having concentric or spiral grooves and wherein the moving element moves radially in a plane parallel to the disk surface.

* * * * *